United States Patent
Chang et al.

(10) Patent No.: US 10,633,964 B2
(45) Date of Patent: Apr. 28, 2020

(54) GAP SUB IMPEDANCE CONTROL

(71) Applicant: Halliburton Energy Services, Inc., Houston, TX (US)

(72) Inventors: Paul Chin Ling Chang, Cypress, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/758,428

(22) PCT Filed: Jan. 30, 2017

(86) PCT No.: PCT/US2017/015639
§ 371 (c)(1),
(2) Date: Mar. 8, 2018

(87) PCT Pub. No.: WO2018/140058
PCT Pub. Date: Aug. 2, 2018

(65) Prior Publication Data
US 2019/0345813 A1    Nov. 14, 2019

(51) Int. Cl.
*G01V 3/26* (2006.01)
*G01V 3/28* (2006.01)
(Continued)

(52) U.S. Cl.
CPC ...... *E21B 47/02216* (2013.01); *E21B 17/003* (2013.01); *E21B 47/09* (2013.01); *G01V 3/18* (2013.01)

(58) Field of Classification Search
CPC .......... E21B 47/122; G01V 3/26; G01V 3/30; G01V 3/28
See application file for complete search history.

(56) References Cited

U.S. PATENT DOCUMENTS 4,496,174 A    1/1985 McDonald et al.
5,138,313 A    8/1992 Barrington
(Continued)

FOREIGN PATENT DOCUMENTS

WO    2010065205    6/2010

OTHER PUBLICATIONS

International Search Report and Written Opinion for Application No. PCT/US2017/015639 dated Sep. 26, 2017.

*Primary Examiner* — Catherine Loikith
(74) *Attorney, Agent, or Firm* — Jason Sedano; C. Tumey Law Group PLLC

(57) ABSTRACT

A method and system for an electromagnetic sensor. A method may comprise introducing an electromagnetic induction tool into a wellbore. The electromagnetic induction tool may comprise an insulated section and an electromagnetic device. The method may further comprise performing a first measurement with the electromagnetic induction tool; adjusting an impedance parameter of the insulated section; performing a second measurement with the electromagnetic induction tool; including the first measurement and the second measurement in an inversion process, wherein the inversion process calculates the downhole electromagnetic parameters; and adjusting at least one operational parameter of a well operation based at least in part on the downhole electromagnetic parameters. An electromagnetic sensor system may comprise a conductive body, an electromagnetic device, and a microcontroller configured to adjust an impedance parameter of the insulated section.

20 Claims, 9 Drawing Sheets

(51) Int. Cl.
*E21B 47/022* (2012.01)
*E21B 17/00* (2006.01)
*E21B 47/09* (2012.01)
*G01V 3/18* (2006.01)

(56) References Cited

U.S. PATENT DOCUMENTS

| | | | |
|---|---|---|---|
| 5,467,083 A * | 11/1995 | McDonald | E21B 47/122 340/854.4 |
| 6,098,727 A | 8/2000 | Ringgenberg et al. | |
| 6,586,939 B1 * | 7/2003 | Fanini | G01V 3/28 324/339 |
| 6,734,675 B2 * | 5/2004 | Fanini | G01V 3/28 324/339 |
| 7,135,870 B2 * | 11/2006 | Mohajer | G01N 22/00 324/639 |
| 7,199,586 B2 * | 4/2007 | Fanini | G01V 3/28 324/339 |
| 7,252,160 B2 | 8/2007 | Dopf et al. | |
| 7,255,183 B2 | 8/2007 | Cramer | |
| 9,696,451 B2 | 7/2017 | Lie et al. | |
| 2007/0247330 A1 | 10/2007 | Clark | |
| 2009/0066334 A1 | 3/2009 | Peter | |
| 2011/0309836 A1 | 12/2011 | Bittar et al. | |
| 2016/0194953 A1 | 7/2016 | Switzer et al. | |
| 2018/0252837 A1 * | 9/2018 | Tang | E21B 47/08 |

* cited by examiner

GAP SUB IMPEDANCE CONTROL

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") operation, wherein the second wellbore may be an injection wellbore while the target wellbore may be a production wellbore. Yet another application may be where knowledge of the target wellbore's location may be needed to avoid collision during drilling of the second wellbore.

Electromagnetic induction tools disposed on bottom hole assemblies may be employed in subterranean operations to determine direction and distance between two wellbores. Electromagnetic induction tools may use different techniques to obtain current on a conductive member in the target wellbore. Approaches may include directly injecting a current into the conductive member and/or inducing a current on a conductive member by transmitting electromagnetic fields by coil antennas positioned in a second wellbore. The injection of current from the electromagnetic induction tools may induce a current along the bottom hole assembly, which may create a direct signal. The direct signal may be sensed and recorded by a receiver disposed on the bottom hole assembly. Recording the direct signal may hinder and/or overshadow secondary signals recorded from a formation and/or target wellbore. Gap subs may be implemented to prevent the propagation of direct signals along the bottom hole assembly. Specifically, gap subs may prevent current from flowing through a section of the bottom hole assembly. In examples, controls may be implemented to control the movement of voltage and/or current through the gap sub, which may allow an operator to cancel out current at any position along the bottom hole assembly.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
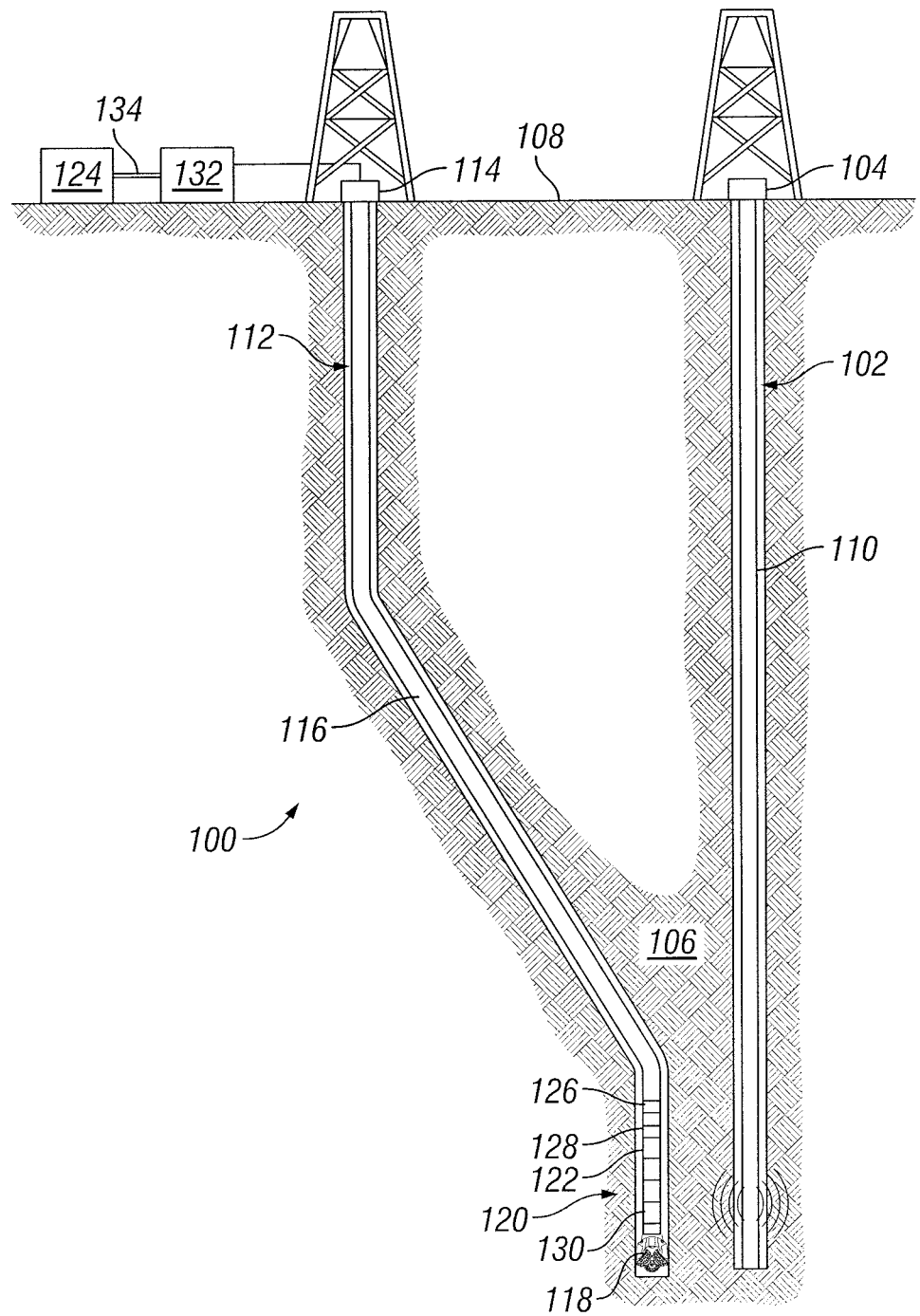
FIG. 1 is a schematic illustration of an example of an electromagnetic sensor system in a wellbore.

This disclosure relates generally to an electromagnetic sensor system in wellbore operations, such as measuring-while-drilling (MWD), logging-while-drilling (LWD), wireline logging, and permanent monitoring operations. Specifically, this disclosure relates to the mitigation of undesired direct coupling between an electromagnetic source and a receiver in an electromagnetic sensor system. This coupling may be a result of conduction currents created on a metallic bottom hole assembly by the excitation of the electromagnetic source. In examples, tubulars may be disposed within the drill collar on a bottom hole assembly, a wireline tool mandrel, and/or permanently installed production casing. For brevity, the metallic tubular will be referred to as a bottom hole assembly below. The receiver in the electromagnetic sensor system may be a magnetometer and/or an induction coil, which may reside on the bottom hole assembly and/or outside. Similarly, where used, either electrode (source and return) may reside on the bottom hole assembly and/or outside, even on the surface.

In certain types of electromagnetic sensor systems, electrical current may be injected into the formation via an electromagnetic source in the form of an electrode pair for logging, ranging, monitoring, and/or measurement purposes, among others. When these sensor systems are used, a significant current density may form on the metallic body of the bottom hole assembly, as current may prefer highly conductive paths over less conductive ones. The receiver may be a device that senses magnetic fields (such as a magnetometer or an induction coil). The bottom hole assembly current near the receiver may create a large coupling signal. This signal (referred to as "direct signal") may be undesired, as it may overshadow the desired signal from the formation and require a large dynamic range. In examples, there may be many different techniques for eliminating or mitigating the direct signal. One technique is to place an insulating gap sub near the receiver. This may limit the axial current strength in the neighborhood of the receiver and may also reduce the direct signal. The present disclosure describes methods for adjusting the gap sub to alter the impedance, which may alter the electromagnetic field path and/or the current.

An electromagnetic sensor system may comprise an electromagnetic induction tool, which may comprise an information handling system, an electromagnetic source and/or receiver. The electromagnetic source and/or receiver may include coils and/or electrodes. Transmission of electromagnetic fields by the electromagnetic source and the recordation of signals by the receiver, may be controlled by an information handling system.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic sensor system 100. Specifically, FIG. 1 shows an electromagnetic sensor system 100 for ranging. As illustrated, a target wellbore 102 may extend from a first wellhead 104 into a subterranean formation 106 from a surface 108. Generally, target wellbore 102 may include horizontal, vertical, slanted, curved, and other types of wellbore geometries and orientations. Target wellbore 102 may be cased or uncased. A conductive member 110 may be disposed within target wellbore 102 and may comprise a metallic material that may be conductive and magnetic. By way of example, conductive member 110 may be a casing, liner, tubing, or other elongated steel tubular disposed in target wellbore 102. Determining the position and direction of target wellbore 102 accurately and efficiently may be required in a variety of applications. For example, target wellbore 4 may be a "blowout" well. Target wellbore 102 may need to be intersected precisely by a second wellbore 112 in order to stop the "blowout." Alternatively, it may be desired to avoid collision with target wellbore 102 in drilling second wellbore 112 or it may be desired to drill the second wellbore parallel to the target wellbore 102, for example, in SAGD applications. In examples, target wellbore 102 may not be accessible and/or information about the position and structure of target wellbore 102 may not be available. Electromagnetic sensor system 100 may be used for determining the location of target wellbore 4 with respect to second wellbore 112.

With continued reference to FIG. 1, second wellbore 112 may also extend from a second wellhead 114 that extends into subterranean formation 106 from surface 108. Generally, second wellbore 112 may include horizontal, vertical, slanted, curved, and other types of wellbore geometries and orientations. Additionally, while target wellbore 102 and second wellbore 112 are illustrated as being land-based, it should be understood that the present techniques may also be applicable in offshore applications. Second wellbore 112 may be cased or uncased. In examples, a drill string 116 may begin at second wellhead 114 and traverse second wellbore 112. A drill bit 118 may be attached to a distal end of drill string 116 and may be driven, for example, either by a downhole motor and/or via rotation of drill string 116 from surface 108. Drill bit 118 may be a part of conductive body 120 at distal end of drill string 116. While not illustrated, conductive body 120 may further comprise one or more of a mud motor, power module, steering module, telemetry subassembly, and/or other sensors and instrumentation as will be appreciated by those of ordinary skill in the art. As will be appreciated by those of ordinary skill in the art, conductive body 120 may be a measurement-while drilling (MWD) or logging-while-drilling (LWD) system.

Electromagnetic sensor system 100 may comprise an electromagnetic induction tool 122. While FIG. 1 illustrates use of electromagnetic induction tool 122 on drill string 116, it should be understood that electromagnetic induction tool 122 may be alternatively used on a wireline. Electromagnetic induction tool 122 may be a part of conductive body 120. Electromagnetic induction tool 122 may be used for determining the distance and direction to target wellbore 102. Additionally, electromagnetic induction tool 122 may be connected to and/or controlled by information handling system 124, which may be disposed on surface 108. In examples, information handling system 124 may communicate with electromagnetic induction tool 122 through a communication line (not illustrated) disposed in (or on) drill string 116. In examples, wireless communication may be used to transmit information back and forth between information handling system 124 and electromagnetic induction tool 122. Information handling system 124 may transmit information to electromagnetic induction tool 122 and may receive as well as process information recorded by electromagnetic induction tool 122. In addition, electromagnetic induction tool 122 may include a downhole information handling system 126, which may also be disposed on conductive body 120. Processing may be performed at surface with information handling system 122, downhole with downhole information handling system 126, or both at the surface and downhole. Downhole information handling system 126 may include, but is not limited to, a microprocessor or other suitable circuitry, for estimating, receiving and processing signals received by the electromagnetic induction tool 122. Downhole information handling system 126 may further include additional components, such as memory, input/output devices, interfaces, and the like. While not illustrated, the electromagnetic induction tool 122 may include one or more additional components, such as analog-to-digital converter, filter and amplifier, among others, that may be used to process the measurements of the electromagnetic induction tool 122 before they may be transmitted to surface 108. Alternatively, raw measurements from electromagnetic induction tool 122 may be transmitted to surface 108.

In examples, electromagnetic induction tool 122 may comprise electromagnetic devices such as an electromagnetic source 128 and/or a receiver 130. It should be noted that electromagnetic induction tool 122 may comprise a plurality of electromagnetic sources 128 and/or a plurality of receivers 130. The plurality of electromagnetic sources 128 and the plurality of receivers 130 may be disposed along a longitudinal axis of the electromagnetic induction tool 122. The plurality of electromagnetic sources 128 may include a magnetic source, such as a magnet assembly (containing permanent and/or electro-magnets), capable of inducing a magnetization in conductive and magnetic member 110 disposed in target wellbore 102.

Any suitable technique may be used for transmitting signals from electromagnetic induction tool 122 to surface 108, including, but not limited to, wired pipe telemetry, mud-pulse telemetry, acoustic telemetry, and electromagnetic telemetry. While not illustrated, conductive body 120 may include a telemetry subassembly that may transmit telemetry data to the surface. An electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer 132. Digitizer 132 may supply a digital form of the telemetry signals to information handling system 124 via a communication link 134, which may be a wired or wireless link. The telemetry data may be analyzed and processed by information handling system 124. For example, the telemetry data could be processed to determine location of target wellbore 102. With the location of target wellbore 102, a driller could control the conductive body 120 while drilling second wellbore 112 to intentionally intersect target wellbore 102, avoid target wellbore 102, and/or drill second wellbore 112 in a path parallel to target wellbore 102.

Figure 2A:
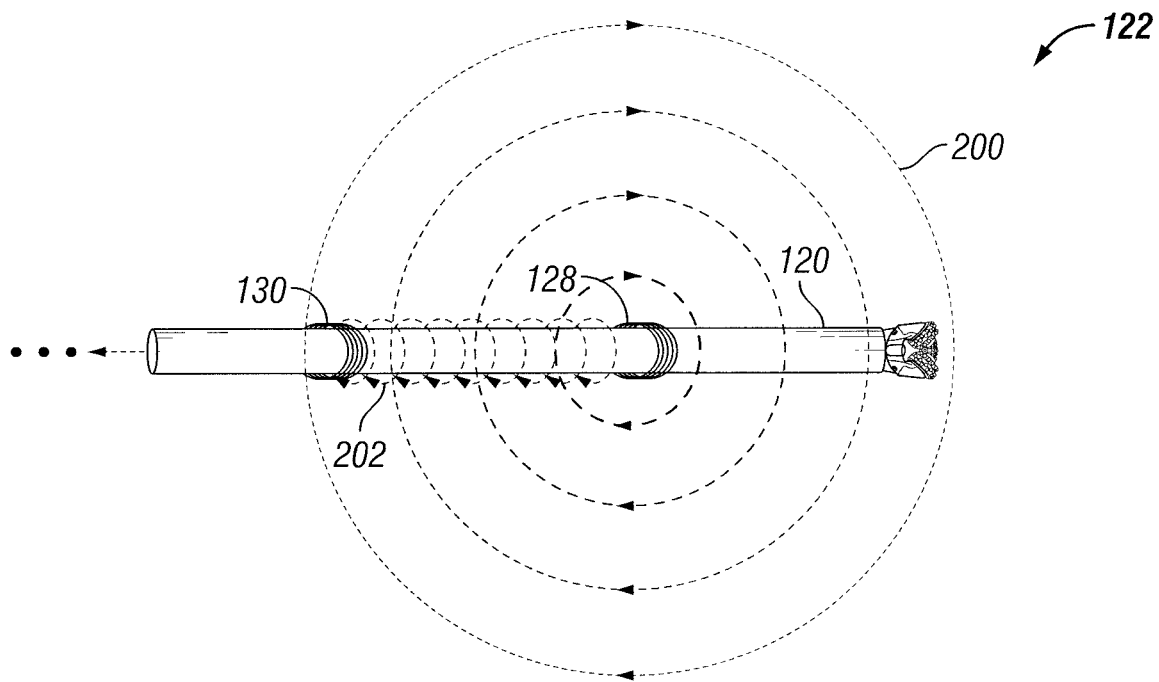
FIG. 2a is a schematic illustration of an electromagnetic induction tool without an insulated section.
Figure 2B:
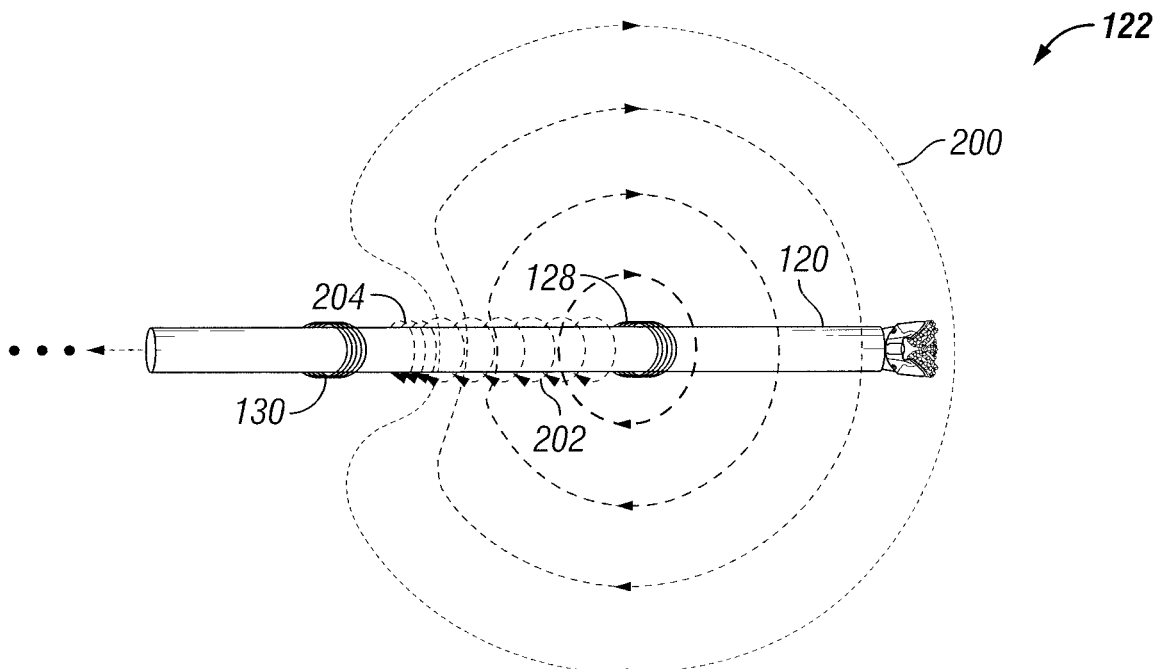
FIG. 2b is a schematic illustration of an electromagnetic induction tool with an insulated section.
Figure 3A:
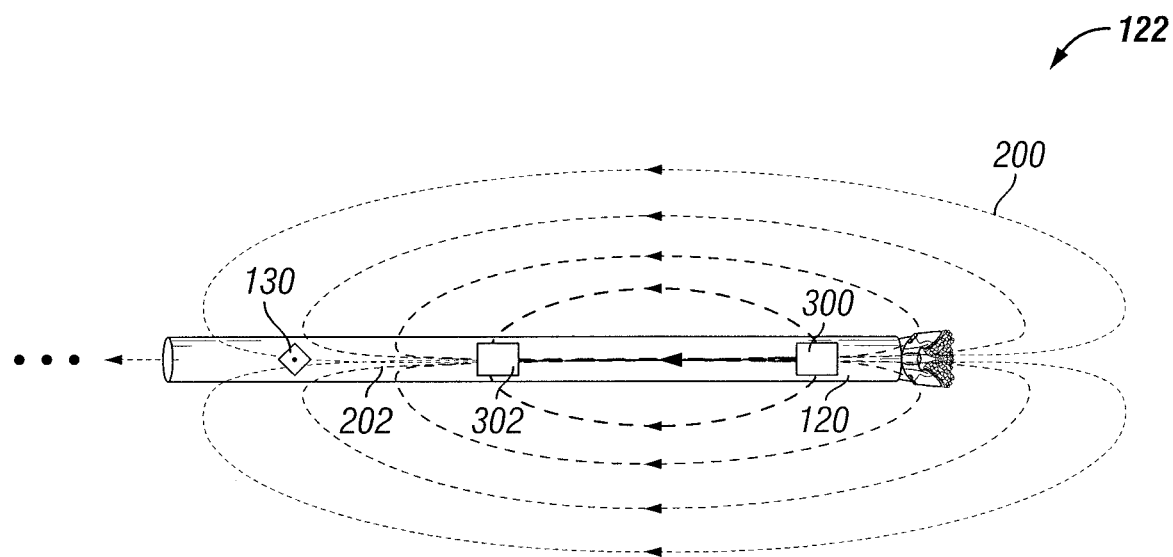
FIG. 3a is a schematic illustration of an electromagnetic induction tool comprising electrodes and no insulated section.
Figure 3B:
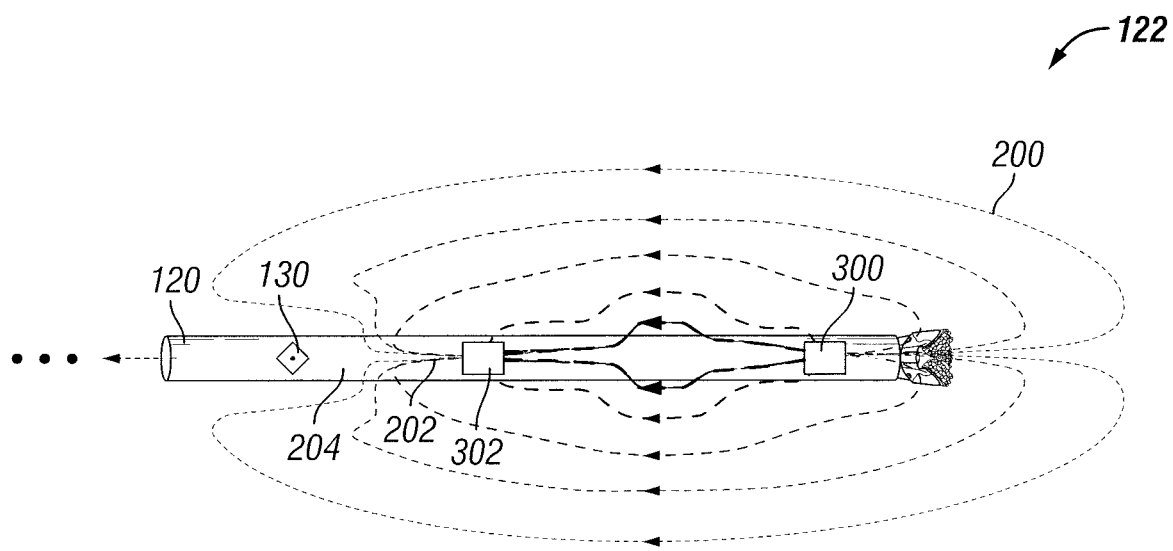
FIG. 3b is a schematic illustration of an electromagnetic induction tool comprising electrodes and an insulated section.

Conductive body 120 may operate to inject electrical current through electromagnetic source 128 into subterranean formation 106 for logging, ranging, monitoring, and/or measurement purposes. During operation, a significant current density may form on the metallic body of conductive body 120, as current prefers highly-conductive paths over less conductive ones. FIG. 2a illustrates electromagnetic induction tool 122, in which electromagnetic source 128, disposed on conductive body 120 may broadcast an electromagnetic field 200. As illustrated, receiver 130 may record direct current 202, which may travel along conductive body 120 from electromagnetic source 128 to receiver 130. FIG. 2b illustrates electromagnetic induction tool 122 in which an insulated section 204 may be disposed between electromagnetic source 128 and/or receiver 130. The insulated section 204 may be a gap sub. As illustrated, insulated section 204 may alter electromagnetic field 200 and may further prevent direct current 202 from reaching receiver 130 from electromagnetic source 128. Impedance from insulated section 204 may block the most direct route within conductive body 120, thus direct current 202 may be prevented from moving further along conductive body 120 and electromagnetic field 200 may be altered. FIGS. 3a and 3b illustrate an additional example of electromagnetic induction tool 122, comprising a source electrode 300 and a receiver electrode 302. FIG. 3a may not have an insulated section 204 disposed on conductive body 120, which may allow for electromagnetic field 200 and direct current 202 to be recorded by receiver 130. FIG. 3b illustrates insulated section 204, which may be disposed between receiver electrode 302 and receiver 130. Insulated section 204 may alter electromagnetic field 200 and direct current 202, which may prevent direct current 202 from reaching receiver 130 and may further distort electromagnetic field 200.

Insulated section 204 may be disposed near and/or about receiver 130. For example, insulated section 204 may be disposed from receivers 130 about one foot to about twelve feet, about four feet to about ten feet, about six feet to about eight feet, and/or about three feet to about eight feet. Disposing insulated sections 204 near and/or about receiver 130 may mitigate direct coupling along conductive body 120, may increase gain and/or target sensitivity of receiver 130, and may prevent shorting of source-return current through conductive body 120. In examples, controlling the impedance within insulated section 204 may allow an operator to control electromagnetic field 200 and/or direct current 202 in advantageous ways. Impedance control may be performed by microcontroller 400 and/or changing a geometric property of insulated section 204.

Figure 4:
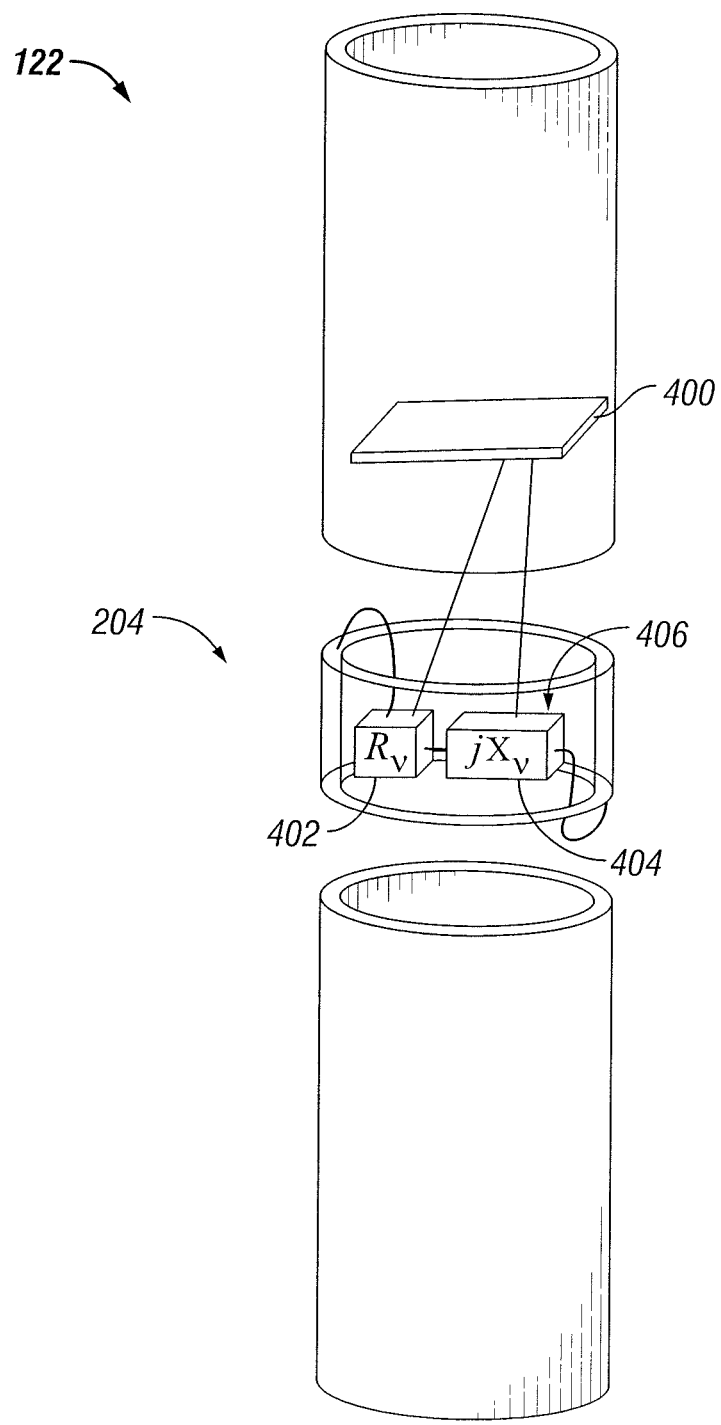
FIG. 4 is a schematic illustration of an insulated section.

FIG. 4 illustrates an insulated section 204 that may be varied in real time to allow for different types of impedance control. Variable impedance may alter the overall impedance of insulated section 204, which may alter electromagnetic field 200 (Referring to FIG. 2a) and/or direct current 202 (Referring to FIG. 2a). Adjusting the variable impedance parameter to a pre-determined value may allow an operator to maximize current isolating, and/or eliminate the functionality of insulated section 204. Adjusting the variable impedance parameter may be based at least in party from one or more previously received signals, which may be recorded by receiver 130 (Referring to FIG. 1). Controlling the variable impedance may be performed by an (e.g. information handling system 124 or downhole information handling system 126 on FIG. 1). Electromagnetic induction tool 122 may comprise one or more insulated sections 204. Controlling each insulated section 204 separately and/or interactively with other insulated section 204 may produce variable current distributions along conductive body 120. As illustrated, a microcontroller 400 may control a variable resistor 402, a variable inductor 404, and/or a variable capacitor 406. In examples, variable resistor 402 may be a potentiometer. Microcontroller 400 may be any suitable circuitry to control insulated section 204 and may be connected to an information handling system (e.g., information handling system 124 or downhole information handing system 126 on FIG. 1).

Figure 5:
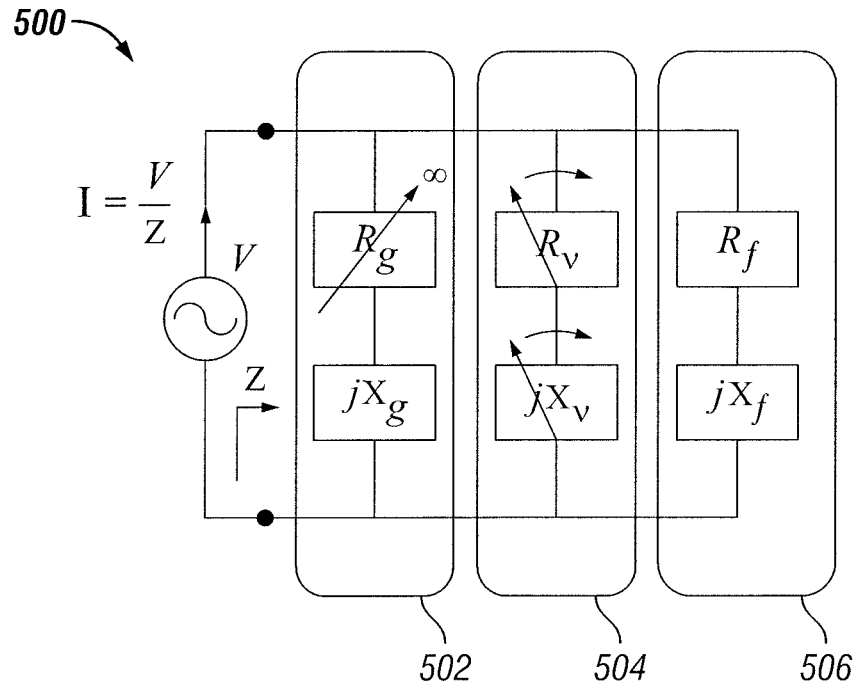
FIG. 5 is a schematic illustration of a representative circuit that represents current flow through an electromagnetic induction tool.
Figure 6:
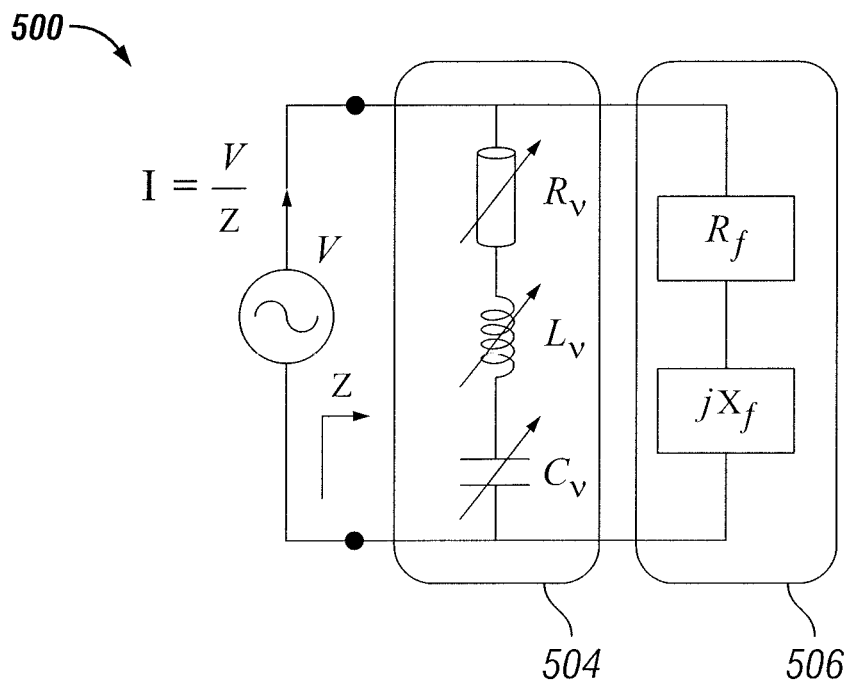
FIG. 6 is a schematic illustration of the representative circuit in a series configuration.
Figure 7:
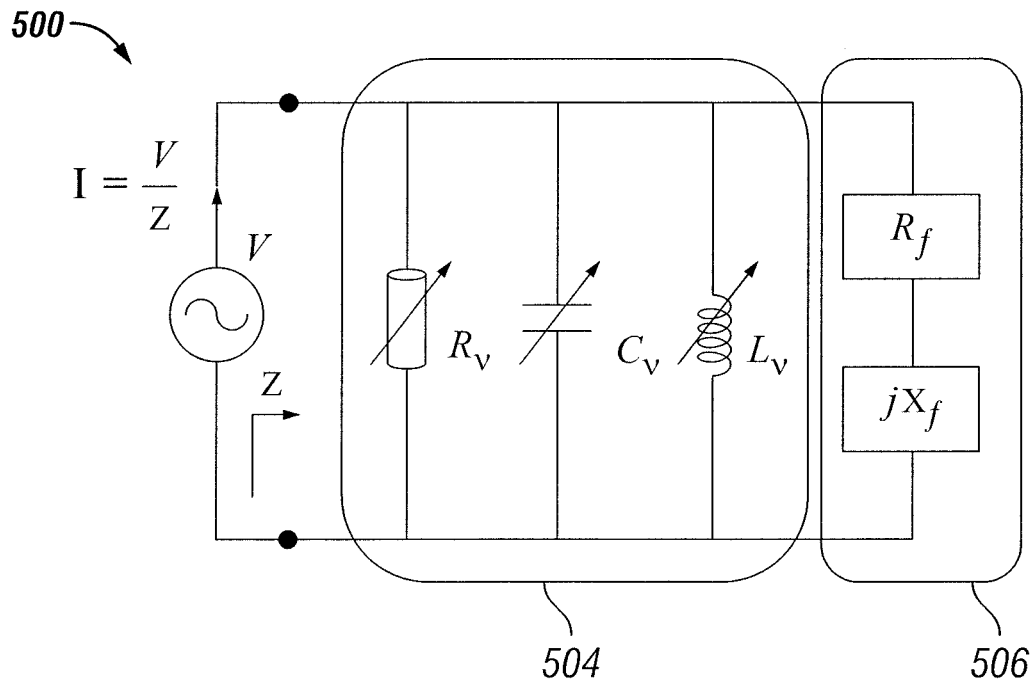
FIG. 7 is a schematic illustration of the representative circuit in a parallel configuration.

FIG. 5 illustrates a circuit diagram 500 which may represent a circuit model of the current flow through electromagnetic induction tool 122. A gap sub circuit 502 may represent insulated section 204, in which no current may pass if activated. A variable impedance circuit 504 may represented variable impedance control in which current may flow through conductive body 120 as controlled by the operator. A formation impedance circuit 506 may represent the current flow through subterranean formation 106, which may be dictated by the geographical makeup and downhole conditions. Gap sub circuit 502 may be an insulators (R=∞), which may block the current path through conductive body 120. Thus, the overall impedance becomes a competition between variable impedance circuit 504 (Rv+j v) and formation impedance circuit 506 (R+). To alter the overall impedance, the variable impedance may be adjusted through combination of variable resistor (Rv), inductor (Lv), and capacitor (Cv) connecting in series as illustrated in FIG. 6 and/or in parallel as illustrated in FIG. 7. When they are in series, the overall impedance of insulated section 204 impedance may be expressed as seen below:

$$Z = \frac{\left(R_v + jwL_v + \frac{1}{jwC_v}\right)(R_f + jX_f)}{\left(R_v + jwL_v + \frac{1}{jwC_v}\right) + (R_f + jX_f)} \quad (1)$$

where w is the radial frequency. For parallel RLC, the overall impedance of insulated section 204 may be expressed as:

$$Z = \frac{\frac{R_v L_v (R_f + jX_f)}{L_v + R_v C_v \left(jwL_v + \frac{1}{jwC_v}\right)}}{\frac{R_v L_v}{L_v + R_v C_v \left(jwL_v + \frac{1}{jwC_v}\right)} + (R_f + jX_f)} \quad (2)$$

Figure 8:
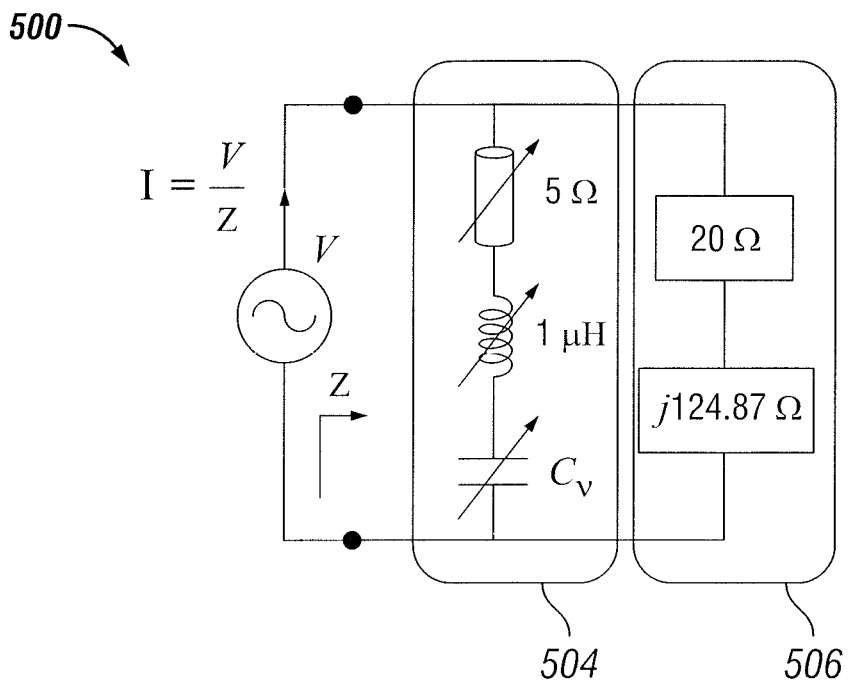
FIG. 8 is a schematic illustration of the representative circuit with variables.
Figure 9:
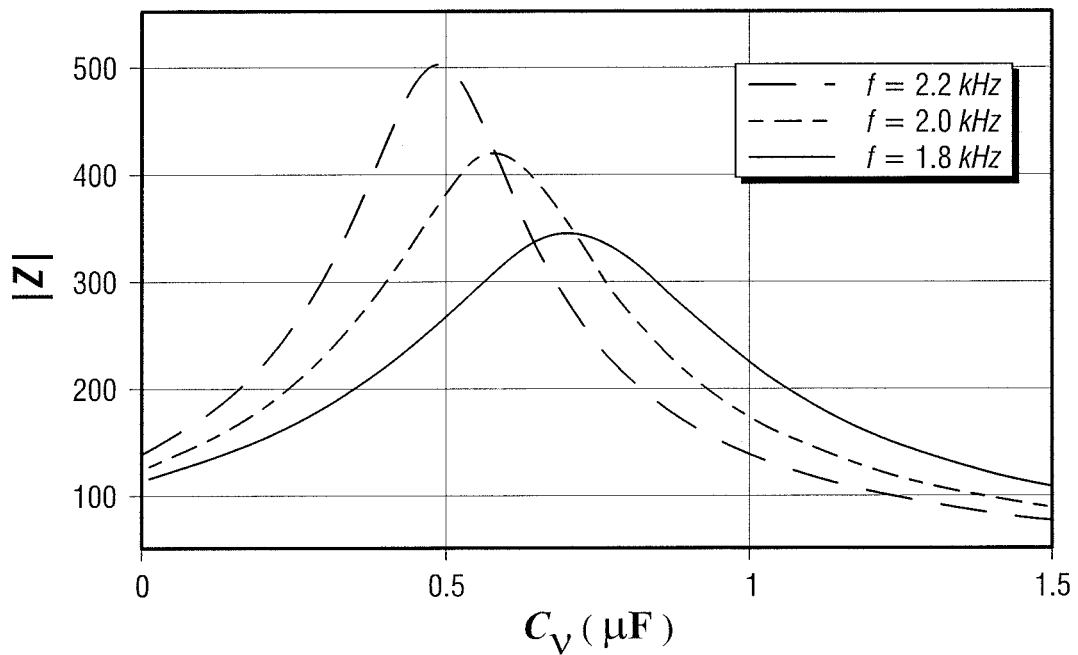
FIG. 9 is a chart illustrating the change in impedance from varying variables within the representative circuit.

By adjusting values of, $L_v$, and $C_v$ an operator may be able to synthetically produce different impedances. FIG. 8 illustrates an example of a RLC circuit which may adjust the impedance of insulated section 204. In this example, subterranean formation 106 may have an impedance of 20+j124.87 ohms which may be input into formation impedance circuit 506. The resistance and inductance of the load may be fixed at 5 ohms and 1 μH, respectively, within variable impedance circuit 504. FIG. 9 illustrates a graph using the variable of variable impedance circuit 504 and formation impedance circuit 506 and further illustrates the change of how impedance magnitude changes with different capacitance for various operating frequencies.

Figure 10:
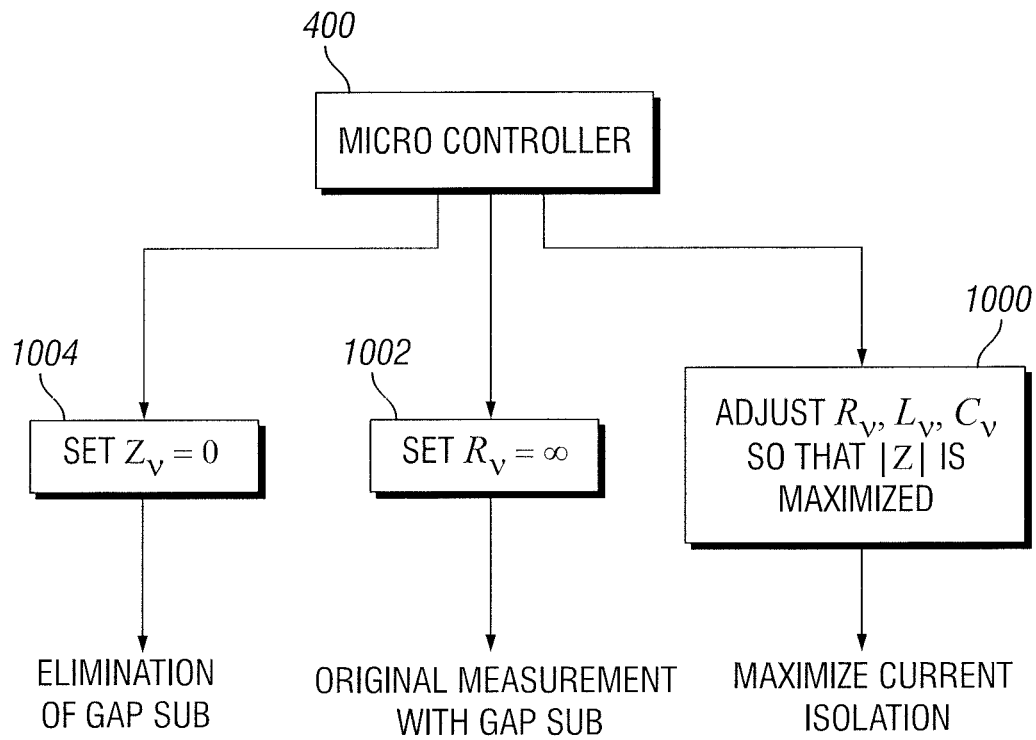
FIG. 10 is a schematic illustration of a flow chart of different results from varying variables within the representative circuit.

FIG. 10 illustrates a flow chart of varying impedance within insulated section 204 (Referring to FIG. 2) for different purposes. Microcontroller 400 (Referring to FIG. 4) may maximize current isolation 1000 on two sides of insulated section 204 by maximizing, $L_v$, and $C_v$. Maximizing the current isolation between the two sides of insulated section 204 may be accomplished by maximizing the overall impedance of insulated section 204. An approach may be to find the derivative of expressions (1) and (2) above with respect to Rv Lv Cv jointly and may set each variable to substantially zero impedance to solve for the relation between Rv, Lv, and Cv. Referring to FIG. 9, the impedance magnitude may have a bell shape curve, where the maximum current isolation at 2 kHz happens when=0.56 μF. However at a different frequency, this value may change. Therefore, in order to find the global maximum, the derivative of expressions (1) and (2) may need to be computed with respect to frequency. In practice, well-logging tools may not operate in a higher kHz frequency range, the capacitance Cv may dominate, therefore an operator may omit the impact of Lv when adjusting impedance for maximum current isolation. Functions may comprise a base measurement 1002 with insulated section 204, which may be found by setting $R_v$ to the highest possible value and an eliminating gap sub step 1004 for measurements may be found by setting $Z_v$ to 0.

In examples, impedance control of insulated section 204 may provide additional measurements for an inversion process. The inversion process may be utilized to calculated downhole electromagnetic parameters. Different impedance of insulated section 204 may alter the current distribution differently, each variation may provide a distinct set of measurements at receivers 130 (Referring to FIG. 1). There may be a set number of impedance combinations among all insulated sections 204 (Referring to FIG. 2) in electromagnetic induction tool 122 (Referring to FIG. 1). The disclosure provides a variety of methods through varying impedance to obtain any number of measurements to work with as opposed to just one without impedance control, in which adequate forward models may be available for modeling electromagnetic induction tool 122 with insulated sections 204.

Figure 11:
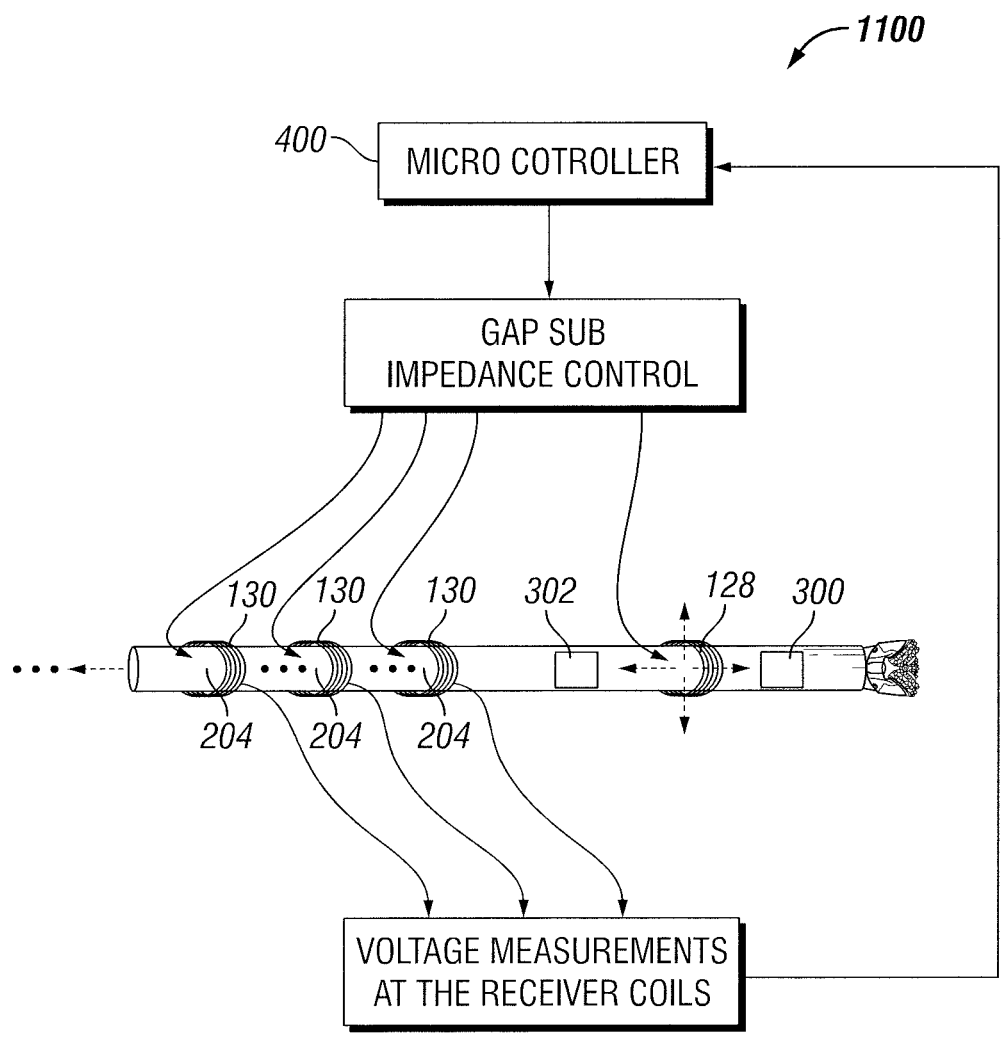
FIG. 11 is a schematic illustration of an electromagnetic induction tool with a feedback controller.

In examples, an intelligent feedback system 1100, as illustrated in FIG. 11, may take a first measurement from receivers 130 (Referring to FIG. 1) as feedback to control the impedance parameter within insulated sections 204 (Referring to FIG. 2), which may produce controlled current distribution within electromagnetic induction tool 122 (Referring to FIG. 1). A second measurement from receivers 130 may be taken and the process repeated. Any number of measurements may be performed. As illustrated, electromagnetic induction tool 122 may comprise electromagnetic source 128, source electrode 300 (Referring to FIG. 3) and receiver electrode 302 (Referring to FIG. 3). Intelligent feedback system 1100 may operate in real time as impedance on insulated section 204 may be adjusted accordingly to fit a selected operation by an operator. In examples, recorded voltage measurements in intelligent feedback system 1100 may be fed to microcontroller 400 for processing and interpretation. For example, the first measurement and second measurement may be utilized in an inversion process. Any number of measurements may be utilized for the inversion process. The inversion process may be able to calculate downhole electromagnetic parameters. In examples, the first measurement and the second measurement may be performed with substantially zero impedance or effectively infinite impedance, which may help in inversion calculations. Calculated downhole electromagnetic parameters may lead to adjusting operational parameters in well operations. Well operations may comprise logging, ranging, monitoring, and/or measurement of the subterranean formation. In examples, microcontroller 400 (Referring to FIG. 4) may be able to determine if voltages stay relatively unchanged across time due to strong direct current 202 (Referring to FIG. 2) from source electrode 300 and receiver electrode 302. Microcontroller 400 may alter the impedance within each insulated section 204 and maximize current isolation, hindering direct current 202, which may allow for intelligent feedback system 1100 to recorded weaker signals from target wellbore 102 (Referring to FIG. 1).

Figure 12:
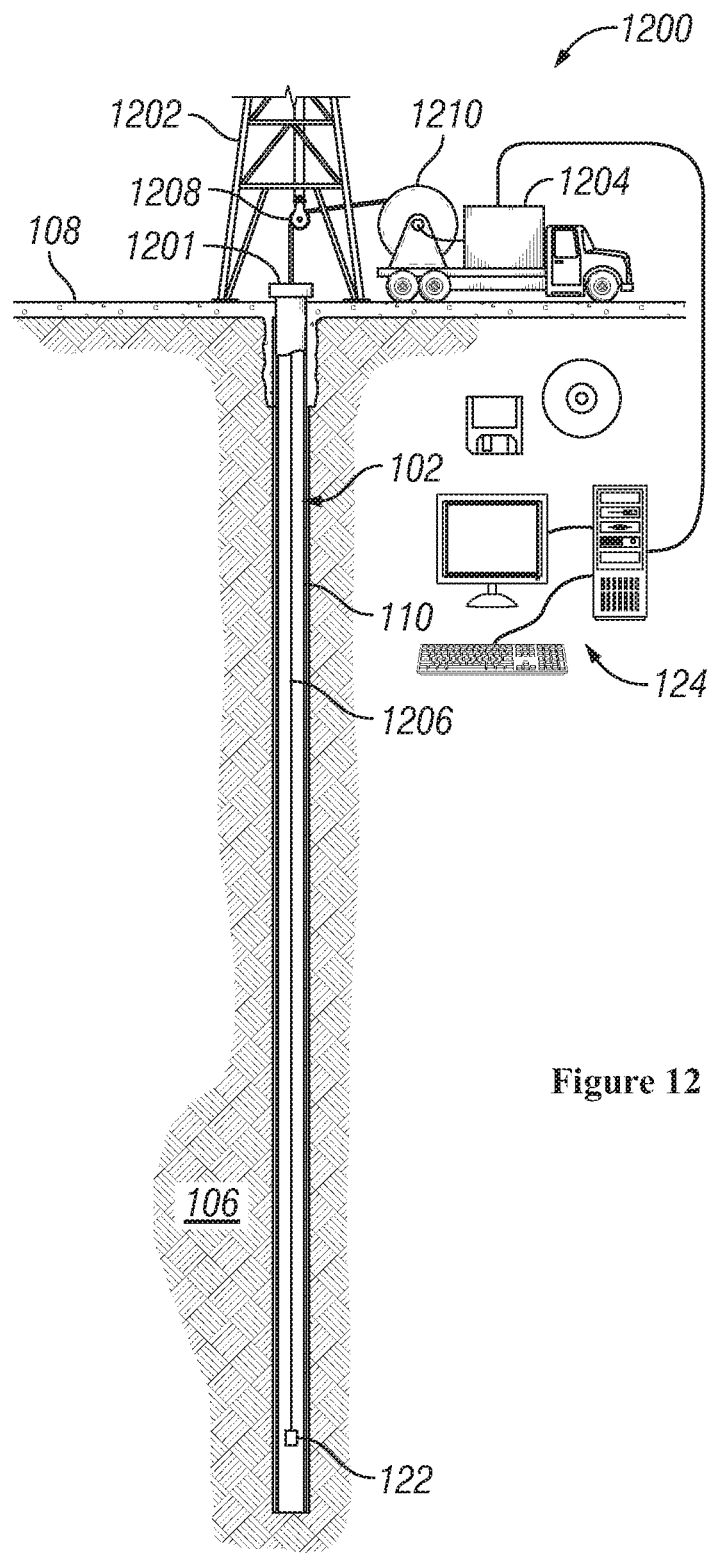
FIG. 12 is a schematic illustration of another example of an electromagnetic sensor system in a wellbore.

In some embodiments, electromagnetic sensor system 100 may be incorporated into a conveyance system 1200. FIG. 12 illustrates a conveyance system 1200. As illustrated, wellbore 102 may extend from wellhead 1201 into subterranean formation 106 from surface 108. Generally, wellbore 102 may include horizontal, vertical, slanted, curved, and other types of wellbore geometries and orientations. A conductive member 110 may be disposed within wellbore 102 and may comprise a metallic material that may be conductive and magnetic. By way of example, conductive member 110 may be a casing, liner, tubing, or other elongated steel tubular disposed in wellbore 102. Properties of subterranean formation 106 may be determined by conveyance system 1200 from within wellbore 102.

Conveyance system 1200 may be supported by derrick 1202 at surface 108. Conveyance system 1200 may be tethered to vehicle 1204 through conveyance 1206. Conveyance 1206 may be disposed around one or more sheave wheels 1208. Derrick 1202 may include a load cell (not shown) which determines the amount of pull on conveyance 1206 at surface 108. Information handling system 124 may control a safety valve (not illustrated) which controls the hydraulic pressure that drives drum 1210 on vehicle 1204, which may reel up and/or release conveyance 1206 which may move electromagnetic induction tool 122 up and/or down. The safety valve may be adjusted to a pressure such that sheave wheel 1208 may only impart a small amount of tension to conveyance 1206 and/or over and above the tension necessary to retrieve conveyance 1206 and/or electromagnetic induction tool 122. The safety valve is typically set a few hundred pounds above the amount of desired safe pull on conveyance 1206 such that once that limit is exceeded, further pull on conveyance 1206 may be prevented.

Conveyance 1206 may individually be a wireline, slickline, coiled tubing, pipe, or the like, which may provide mechanical suspension as well as electrical conductivity for electromagnetic induction tool 122. Where it may provide electrical conducting, conveyance 1206 may comprise an inner core of a plurality of electrical conductors covered by an insulating wrap. An inner and outer steel armor sheath may be disposed around the conductors. The electrical conductors may be used for communicating power and telemetry between vehicle 1204 (or other equipment) and electromagnetic induction tool 122.

This systems and methods may include any of the various features of the compositions, methods, and system disclosed herein, including one or more of the following statements.

Statement 1: A method comprising: introducing an electromagnetic induction tool into a wellbore, wherein the electromagnetic induction tool comprises: an insulated section; an electromagnetic device disposed within about 15 feet of the insulated section, wherein the electromagnetic device comprises at least one device selected from the group consisting of an electromagnetic source and a receiver; performing a first measurement with the electromagnetic induction tool; adjusting an impedance parameter of the insulated section; performing a second measurement with the electromagnetic induction tool; including the first measurement and the second measurement in an inversion process, wherein the inversion process calculates the downhole electromagnetic parameters; and adjusting at least one operational parameter of a well operation based at least in part on the downhole electromagnetic parameters.

Statement 2: The method of statement 1, wherein the electromagnetic source is disposed on the electromagnetic induction tool, and the receiver is disposed on the electromagnetic induction tool, wherein the electromagnetic source and the receiver are individually spaced from the insulated section a distance that is less than 3 feet from the electromagnetic source or the receiver.

Statement 3: The method of statement 1 or 2, wherein the insulated section is a gap sub.

Statement 4: The method of any preceding statement, wherein the insulated section is a gap sub and wherein adjusting the impedance parameter comprises adjusting the impedance parameter electrically with at least one of a potentiometer, variable capacitor, or variable inductor.

Statement 5: The method of any preceding statement, wherein adjusting the impedance parameter comprises adjusting the impedance parameter mechanically by changing a geometric property of a component of the insulated section.

Statement 6: The method of any preceding statement, wherein the impedance parameter is at least in part resistive and wherein the impedance parameter is at least in part inductive.

Statement 7: The method of any preceding statement, wherein the impedance parameter is at least in part capacitive and wherein adjusting the impedance parameter comprises adjusting the impedance parameter with a microcontroller and wherein adjusting the impedance parameter is at least in part a function of formation impedance.

Statement 8: The method of any preceding statement, wherein the electromagnetic source or the receiver comprises an electrode or a coil.

Statement 9: The method of any preceding statement, wherein the first measurement or the second measurement is performed with a substantially zero impedance and wherein the first measurement or the second measurement is performed with an effectively infinite impedance.

Statement 10: The method of any preceding statement, wherein adjusting the impedance parameter comprises adjusting a gap sub impedance to be about a formation impedance.

Statement 11: The method of any preceding statement, wherein the electromagnetic tool further comprises disposing a second insulated section within about 15 feet of the electromagnetic device, wherein the method further comprises adjusting an impedance parameter of the second insulated section and wherein the performing the second measurement is performed after the impedance parameter of the insulated section and the impedance parameter of the second insulated section are adjusted.

Statement 12: The method of any preceding statement, further comprising performing a third measurement after the impedance parameter of the second insulated section is adjusted and after the second measurement is performed, wherein the third measurement is implemented in the inversion process.

Statement 13: The method of any preceding statement, wherein the impedance parameter is adjusted to a predetermined value.

Statement 14: The method of any preceding statement, wherein the impedance parameter is adjusted based at least in part on one or more previously received signals.

Statement 15: The method of any preceding statement, wherein the well operation is a drilling, logging, production, or completion operation.

Statement 16: An electromagnetic sensor system, comprising: a conductive body, wherein the conductive body comprises an insulated section; an electromagnetic device disposed within about 15 feet of the insulated section, wherein the electromagnetic device comprises at least one device selected from the group consisting of a electromagnetic source and a receiver; and a microcontroller configured to adjust an impedance parameter of the insulated section.

Statement 17: The electromagnetic sensor system of statement 16, further comprising a receiver disposed on the downhole tool, wherein the electromagnetic source and the receiver are individually spaced from the insulated section a distance that is less than 3 feet between the electromagnetic source and the receiver.

Statement 18: The electromagnetic sensor system of statement 16 or statement 17, wherein the insulated section is a gap sub.

Statement 19: The electromagnetic sensor system of any preceding statement, further comprising a potentiometer, a variable capacitor, or a variable inductor.

Statement 20: The electromagnetic sensor system of any preceding statement, wherein the electromagnetic source or the receiver comprises an electrode or a coil.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   introducing an electromagnetic induction tool into a wellbore, wherein the electromagnetic induction tool comprises:
   an insulated section; and
   an electromagnetic device disposed within about 15 feet of the insulated section, wherein the electromagnetic device comprises at least one device selected from the group consisting of an electromagnetic source and a receiver;
   performing a first measurement with the electromagnetic induction tool;
   adjusting an impedance parameter of the insulated section;
   performing a second measurement with the electromagnetic induction tool;
   including the first measurement and the second measurement in an inversion process, wherein the inversion process calculates one or more downhole electromagnetic parameters; and
   adjusting at least one operational parameter of a well operation based at least in part on the one or more downhole electromagnetic parameters.

2. The method of claim 1, wherein the electromagnetic source is disposed on the electromagnetic induction tool, and the receiver is disposed on the electromagnetic induction tool, wherein the electromagnetic source and the receiver are individually spaced from the insulated section a distance that is less than 3 feet from the electromagnetic source or the receiver.

3. The method of claim 1, wherein the insulated section is a gap sub.

4. The method of claim 1, wherein the insulated section is a gap sub and wherein adjusting the impedance parameter comprises adjusting the impedance parameter electrically with at least one of a potentiometer, variable capacitor, or variable inductor.

5. The method of claim 1, wherein adjusting the impedance parameter comprises adjusting the impedance parameter mechanically by changing a geometric property of a component of the insulated section.

6. The method of claim 1, wherein the impedance parameter is at least in part resistive and wherein the impedance parameter is at least in part inductive.

7. The method of claim 1, wherein the impedance parameter is at least in part capacitive and wherein adjusting the impedance parameter comprises adjusting the impedance parameter with a microcontroller and wherein adjusting the impedance parameter is at least in part a function of formation impedance.

8. The method of claim 1, wherein the electromagnetic source or the receiver comprises an electrode or a coil.

9. The method of claim 1, wherein the first measurement or the second measurement is performed with a substantially zero impedance and wherein the first measurement or the second measurement is performed with an effectively infinite impedance.

10. The method of claim 1, wherein adjusting the impedance parameter comprises adjusting a gap sub impedance to be about a formation impedance.

11. The method of claim 1, wherein the electromagnetic tool further comprises disposing a second insulated section within about 15 feet of the electromagnetic device, wherein the method further comprises adjusting an impedance parameter of the second insulated section and wherein the performing the second measurement is performed after the impedance parameter of the insulated section and the impedance parameter of the second insulated section are adjusted.

12. The method of claim 11, further comprising performing a third measurement after the impedance parameter of the second insulated section is adjusted and after the second measurement is performed, wherein the third measurement is implemented in the inversion process.

13. The method of claim 1, wherein the impedance parameter is adjusted to a pre-determined value.

14. The method of claim 1, wherein the impedance parameter is adjusted based at least in part on one or more previously received signals.

15. The method of claim 1, wherein the well operation is a drilling, logging, production, or completion operation.

16. An electromagnetic sensor system, comprising:
a conductive body, wherein the conductive body comprises an insulated section, wherein an impedance of the insulated section is adjustable;
an electromagnetic device disposed within about 15 feet of the insulated section, wherein the electromagnetic device comprises at least one device selected from the group consisting of an electromagnetic source and a receiver; and
a microcontroller configured to adjust one or more impedance parameters of the insulated section which change the impedance of the insulated section.

17. The electromagnetic sensor system of claim 16, further comprising a receiver disposed on a downhole tool, wherein the electromagnetic source and the receiver are individually spaced from the insulated section a distance that is less than 3 feet between the electromagnetic source and the receiver.

18. The electromagnetic sensor system of claim 16, wherein the insulated section is a gap sub.

19. The electromagnetic sensor system of claim 16, further comprising a potentiometer, a variable capacitor, or a variable inductor.

20. The electromagnetic sensor system of claim 16, wherein the electromagnetic source or the receiver comprises an electrode or a coil.

\* \* \* \* \*